(12) United States Patent
Harrison

(10) Patent No.: US 8,209,794 B1
(45) Date of Patent: Jul. 3, 2012

(54) AUTOMATIC POOL LEVEL

(76) Inventor: Charles Harrison, Fort Worth, NJ (US)

( * ) Notice: Subject to any disclaimer, the term of this patent is extended or adjusted under 35 U.S.C. 154(b) by 9 days.

(21) Appl. No.: 13/048,253

(22) Filed: Mar. 15, 2011

(51) Int. Cl.
  *E04H 4/00* (2006.01)
(52) U.S. Cl. .......................................... 4/508; 340/618
(58) Field of Classification Search ....... 4/408; 340/618
  See application file for complete search history.

(56) References Cited

U.S. PATENT DOCUMENTS

| | | | |
|---|---|---|---|
| 4,069,405 A | 1/1978 | Fima | |
| 4,342,125 A | 8/1982 | Hodge | |
| 4,380,091 A | 4/1983 | Lively | |
| 4,817,217 A | 4/1989 | Lively | |
| 5,203,038 A | 4/1993 | Gibbs | |
| 5,365,617 A | 11/1994 | Tarr | |
| 6,223,359 B1 | 5/2001 | Oltmanns et al. | |
| 6,718,567 B2 | 4/2004 | Gibson et al. | |
| 7,318,344 B2 | 1/2008 | Heger | |
| 7,395,559 B2 | 7/2008 | Gibson et al. | |

*Primary Examiner* — Gregory Huson
*Assistant Examiner* — Karen L Younkins
(74) *Attorney, Agent, or Firm* — Goldstein Law Offices, P.C.

(57) ABSTRACT

An automatic pool level controller that maintains a water level water in a swimming pool to protect the pool both from a low water level and from overflow conditions that disable pool equipment from operating. The controller monitors water level with a plurality of adjustable conducting sensors that connect to a plurality of relays that control a plurality of switches and a solenoid valve to automatically add water to the pool when the water level falls below the desired level, and halt addition of water when the desired level is achieved, automatically turning on a pump to expel water to reduce the water level, and automatically turning a pump off to halt the discharge of water when the water is reduced to the desired level, maintaining the water level sufficient for operating pool equipment. The controller has an immersible sensor board, a submersible pump and runs on household current.

17 Claims, 5 Drawing Sheets

AUTOMATIC POOL LEVEL

BACKGROUND OF THE INVENTION

The invention relates generally to a controller that automatically maintains a level of water in a swimming pool. More particularly, the invention relates to a controller for a water level system for a swimming pool that monitors water level and automatically replenishes or expels water to maintain the desired level of water in the pool.

Backyard pools mean loads of fun, but also mean loads of maintenance and diligence to maintain the cleanliness of the water. The pool owner must use both chemical and mechanical means to keep the water safe from organisms that cause a panoply of illnesses, some serious. Debris, stray animals, and normal use all contribute to the bioburden in the water. Pools are treated chemically to prevent bacterial and fungal growth. Mechanical means of cleaning the pool include a pool pump, a filter and a skimmer. The skimmer is typically located at the water line of a swimming pool. It filters out the floating debris from the pool before it sinks to the bottom of the pool. This prevents the debris from being pulled into and clogging the filter. The skimmer is in the upper part of the side of both in-ground and above-ground pools.

For the skimmer to work efficiently, the water level must be at the level of the skimmer inlet. The skimmer inlet is around one-half foot in height, but can vary as much as from three to nine inches. If the water level is below the skimmer, the skimmer cannot function because the floating debris is below the inlet. Additionally, the pump runs dry, sucks air instead of water, causing the pump to overheat and potentially burn out. If the water level is above the skimmer, debris floating on the water is above the skimmer and the skimmer cannot capture it. The pool owner wants the water level to be within the range of the opening of the skimmer inlet, otherwise debris will clog the pump and the sudden increase in bioburden from debris possibly could overwhelm the chemical system.

Pool water levels change generally due to natural causes. Evaporation, particularly from solar heating, causes the water level to decrease. Many have proposed various solutions to this problem. Most of these solutions are difficult to install and are permanently connected to the pool. One solution has been proposed that is as a separate permanent float chamber external to the pool with a floating sensor that opens a valve to recirculate water to maintain water level and in one example, uses a ball-cock valve to add water. Others have proposed a single cantilevered sensor connected to a hose with a valve to add water. A wireless system employing a pair of capacitive electrodes that transmit information about liquid level to receiver controlling pumps has been also proposed, as well as a flow controller with two micro-switches inside a immersible chamber inside a second chamber.

As electronic systems become more complex, one has proposed delay and monitoring circuitry to adjust levels by signally when to add and when to stop adding water. Others use a transmitter and a microprocessor sensor to transmit radio signals to open valve to add water. The system turns on an overfill counter to prevent the water level from exceeding the desired level. Others have invented systems to prevent false signals to add water by detecting small variations in the water level caused by waves created by a child entering the pool or has delay circuits so that normal motion does create a false signal to add water.

All of these units are for adding water to make up for water lost in evaporation. However, occasionally a pool becomes overfilled because of a heavy rainstorm that dumps inches of water in a short time at a rate up to two inches per hour. Just as a skimmer is ineffective when the water level is below the skimmer, so too it is ineffective when the water level is above. Ironically, this is when a skimmer is especially needed, because storms often cause a large amount of debris to be scattered that ends up in the pool. Even if the pool owner has a reversible pump to remove the excess water, it is generally unsafe to go outside in a heavy storm to manually turn it on, especially if there is lightning activity. None have proposed a solution for reducing the water level in this or similar situations.

While these units may be suitable for the particular purpose employed, or for general use, they would not be as suitable for the purposes of the present invention as disclosed hereafter.

SUMMARY OF THE INVENTION

It is an object of the invention to produce a controller that runs unattended to automatically maintain a level of water in a swimming pool. Accordingly, the automatic pool level controller has a plurality of sensors that control a plurality of switches and a solenoid valve to automatically add water to the pool when the water level falls below the desired level, and halt addition of water when the desired level is achieved, automatically turning on a pump to expel water to reduce an overfill water level, and automatically turning a pump off to halt the discharge of water when the water is reduced to the desired level, without attention from a pool owner.

It is an object of the invention to produce a controller that automatically maintains a level of water in a swimming pool to protect the pool from a low water level or a high water level that is inexpensive and easy to install. Accordingly, the automatic pool level controller has a plurality of simple hose couplings that simply fit onto a garden hose, a housing that sits poolside with an immersible board of sensors, the board supporting a submersible pump and an electrical cord that plugs into normal household current, the automatic pool level controller selectively installed poolside by placing the housing on the pool edge, with the sensors and pump submersed, attaching the hose couplings to an ordinary garden hose and plugging in the electrical cord to household current.

It is another object of the invention to produce a controller that automatically maintains a level of water in a swimming pool to protect the pool from a low water level, the low level below a pool equipment, disabling the pool equipment. Accordingly, the automatic pool level controller monitors water level with a plurality of sensors that operate a solenoid valve that opens to automatically add water to the pool when the water level falls below the desired level, and closes to halt addition of water when the level is sufficient for operating the pool equipment.

It is a further object of the invention to produce a controller that automatically maintains a level of water in a swimming pool to protect the pool from a high water level, the high level above a pool equipment, disabling the pool equipment. Accordingly, the automatic pool level controller monitors water level with a sensor that operates a relay switch, automatically turning on a pump to expel water to reducing the water level, and automatically turning off a pump to halt the discharge of water when the water is reduced to the desired level, reducing the water level to a level sufficient for operating the pool equipment and maintaining the desired water level.

It is another object of the invention to produce a controller that safely releases water out of a swimming pool when a storm adds a large quantity of water to the pool. Accordingly, the automatic pool level controller monitors water level and automatically expels when the water level falls rises the desired level, eliminating the need for manually turning on a pump during the storm and preventing injury from lightning and falling debris.

The invention is an automatic pool level controller that automatically maintains a level of water in a swimming pool to protect the pool from both a low water level and overflow conditions that disable pool equipment from operating. The controller monitors water level with a plurality of adjustable conducting sensors that connect to a plurality of relays that control a plurality of switches and a solenoid valve to automatically add water to the pool when the water level falls below the desired level, and halt addition of water when the desired level is achieved, automatically turning on a pump to expel water to reduce the water level, and automatically turning a pump off to halt the discharge of water when the water is reduced to the desired level, maintaining the water level at a level sufficient for operating pool equipment. The controller has a plurality of simple hose couplings, a housing that sits poolside with an immersible board of sensors, the board supporting a submersible pump and an electrical cord that plugs into household current. The controller selectively installs poolside by placing the housing on a pool edge, with the sensors and pump submersed, attaching the hose couplings and plugging in the electrical cord.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
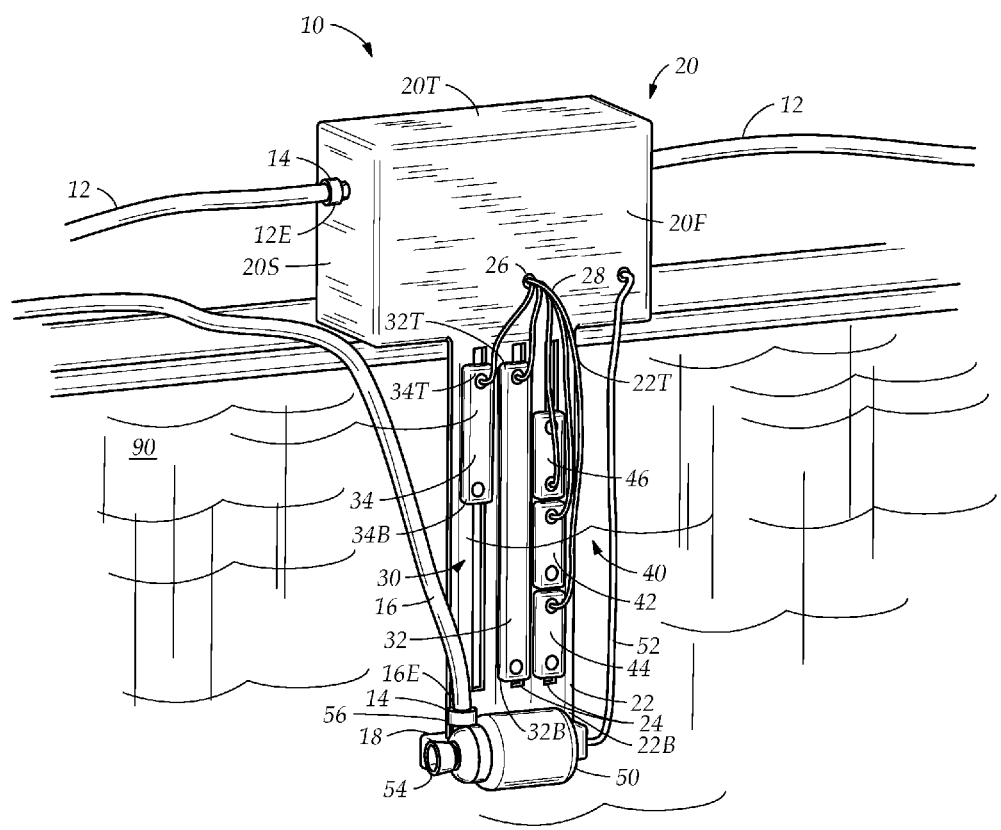
FIG. 1 is a diagrammatic perspective front view of the invention installed poolside.

An automatic pool level controller 10, illustrated in FIG. 1, is a portable system for maintaining a water level in a swimming pool 90, protecting the pool from overflow and low water levels, maintaining the water level for pool equipment to properly function. The controller 10 is easily and selectively installed in a swimming pool 90 and functions completely unattended. The controller 10 is inside a housing 20, the housing 20 having a front panel 20F and a board 22 extending down the front panel 20F into the pool water. A plurality of novel conducting sensors 30 are adjustably mounted on the board 22, the sensors 30 monitoring the water level. Inside the housing 20 is circuitry including a plurality of switches and a solenoid valve connected by a plurality of relays that controls water flow in and out of the pool 90. Attached to the board 22 is a submersible pump 50 with a flexible hose 16, the hose extending outside the pool 90.

FIG. 1 shows the novel sensor system 30 adjustably mounted on the board 22. The sensor system 30 comprises aluminum rods that conduct current. A first rod, a power supply rod 32 has a top 32T and a bottom 32B defining a length, the length extending slightly below a minimum level of water that requires water to be added to slightly above a maximum level of water that requires the pump 50 to power on and expel water. The power supply rod 32 draws a constant 15 volts from the system and remains powered at that level when the controller is installed and plugged to an AC current source. A second sensor, a pump sensor 34, is parallel to the power supply rod 32. The pump sensor 34 has a top 34T and a bottom 34B defining a length. The top 34T of the pump 34 sensor is set at the overflow water level; the bottom of the pump sensor 34B is set congruent with a water level sufficient for the pool equipment. A series of sensors 40 are parallel to the pump sensor 34 and the power supply rod 32, the sensors 40 in the series vertically aligned in a column configuration. The series of sensors 40 control a solenoid valve inside the housing 20 that opens, allowing water to flow into the pool 90 and closes when the necessary water has been added to reach the level sufficient for the pool equipment. The series has a lower sensor 44 that detects a low level of water and opens the solenoid valve and an upper sensor 42 that detects when the necessary water has been added to reach the necessary water has been added and closes the solenoid valve. In one embodiment, above the upper sensor 42, is a fault sensor 46. The plurality of sensors are wired to a plurality of circuits inside the housing 20 and operate the controller 10 as described hereinbelow.

The controller supplies a constant 15 volts to the power supply rod 32. When the water level reaches the top of the pump sensor 34, the water conducts an electric current from the power supply rod 32 to the pump sensor 34, completing the circuit. The pump sensor 34 is wired to a pump relay inside the housing 20 that switches on the pump 50. The pump 50 expels water from the pool 90, reducing the water level. When the water level falls below the bottom 34B of the pump sensor 34B, the current is interrupted, switching off the pump 50.

The housing has the front panel and a rear panel 20R, a top panel 20T, a bottom panel 20B and the pair of side panels 20S, the panels having edges, the edges of the side, top and bottom panels connecting the front and rear panels at the edges. The rear panel and the pool deck each have an eyebolt 70 installed. Outside the housing are a pair of couplings 14 and a pair of hose segments 12, each with a pair of ends 12E, the couplings attaching a first end 12E of the hose segments to the side panels 20S of the housing 20, one hose segment to each side panel 20S. A second end of one hose segment is further attached to a domestic water supply and a second end of the other hose segment is placed into the pool. The pool owner can choose the most convenient hose segment 12 to attach to the domestic water supply, the orientation of the hose segments irrelevant to the functioning of the controller.

When the water level falls below the lower solenoid sensor 44, the circuit between the power supply rod 32 is completed, signally a first relay connected to a solenoid relay, opening the solenoid valve. The solenoid valve is inside tubing connected to the couplings 14 on the hose segments 12. When the valve is open, water flows through the hose segments 12 from the domestic water supply to the pool 90. When the water level reaches the desired level at the top of the upper sensor 42, the upper series sensor 42 completes the circuit between the power supply rod 32 and a second relay connected to the solenoid relay, closing the solenoid valve. When the valve is closed, water no longer flows through the hose segments 12 from the domestic water supply to the pool 90.

In a further embodiment, the top sensor in the series is a fault sensor 46. The controller 10 has a 9 volt battery backup.

If the AC current fails during the filling process, power will continue to be drawn through the solenoid valve by the power supply rod 32, drawing off power from the 9 volt fault battery. To prevent over-filling the pool 90, if the water reaches the fault sensor 46, the circuit is completed, the solenoid valve draws from the fault battery and closes.

Figure 3:
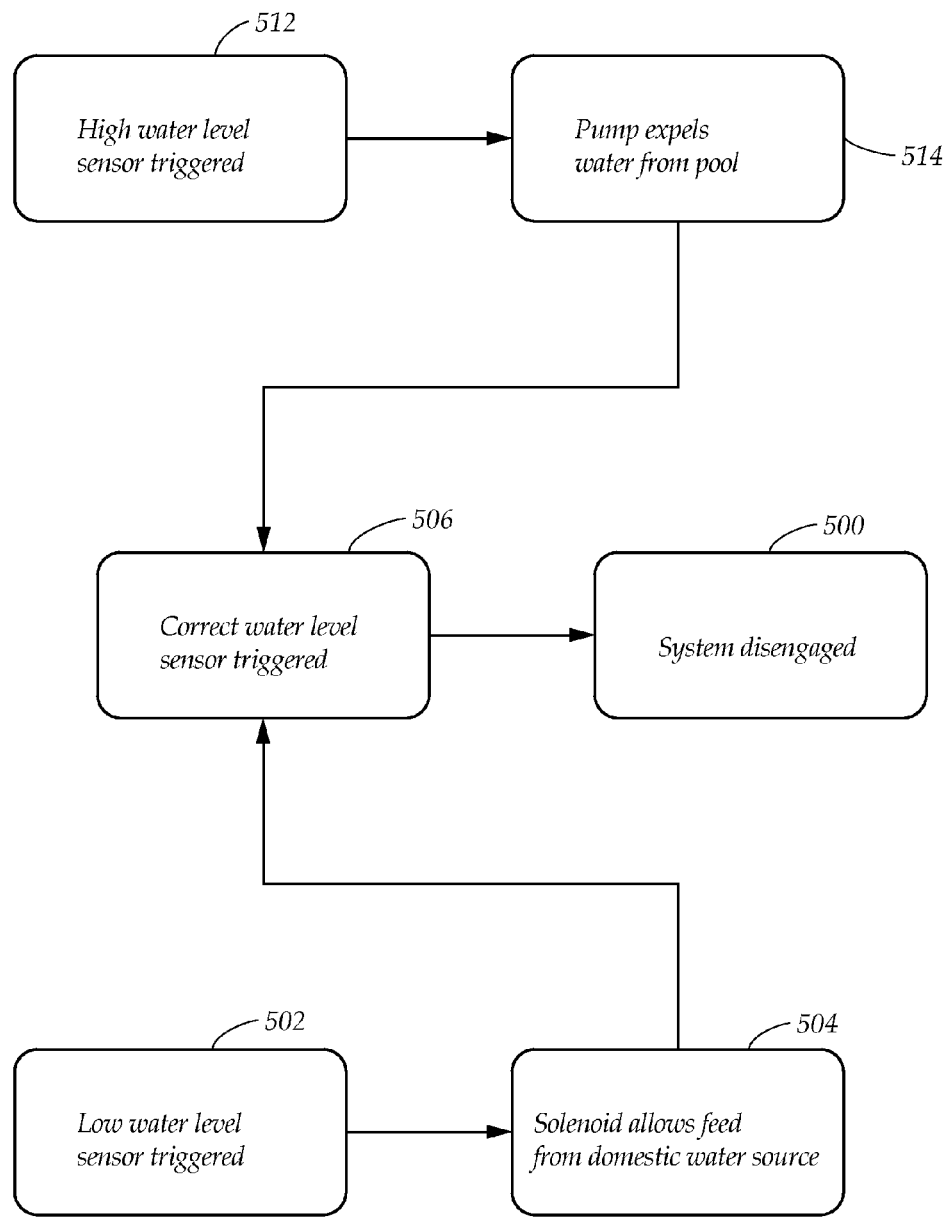
FIG. 3 is a block diagram showing the process for maintaining a level of water in a swimming pool.

FIG. 3 shows a flow diagram of the controller logic. When the pump sensor is triggered by high water level 512, the pump is turned on and expels water from the pool 514. When the solenoid sensors detect a low water level, the solenoid valve is triggered 502 to feed domestic water into the pool 504. When sensors detect that the water level is correct 506, the pump is shut off or the valve is closed, disengaging the system 500.

FIG. 3 shows a wiring diagram of the controller. The controller has five relays, the first relay connected to the lower solenoid sensor, the second relay connected to the upper solenoid sensor, the vault relay connected to the fault sensor, the pump switch relay connected to the pump and the solenoid valve relay connected to the first, second and vault relays. The fault battery is connected to a pair of switches connecting to a 15 volt power lead to the main sensor, so that power to the main sensor switches from 15 volt power to the battery when there is a fault.

Figure 4:
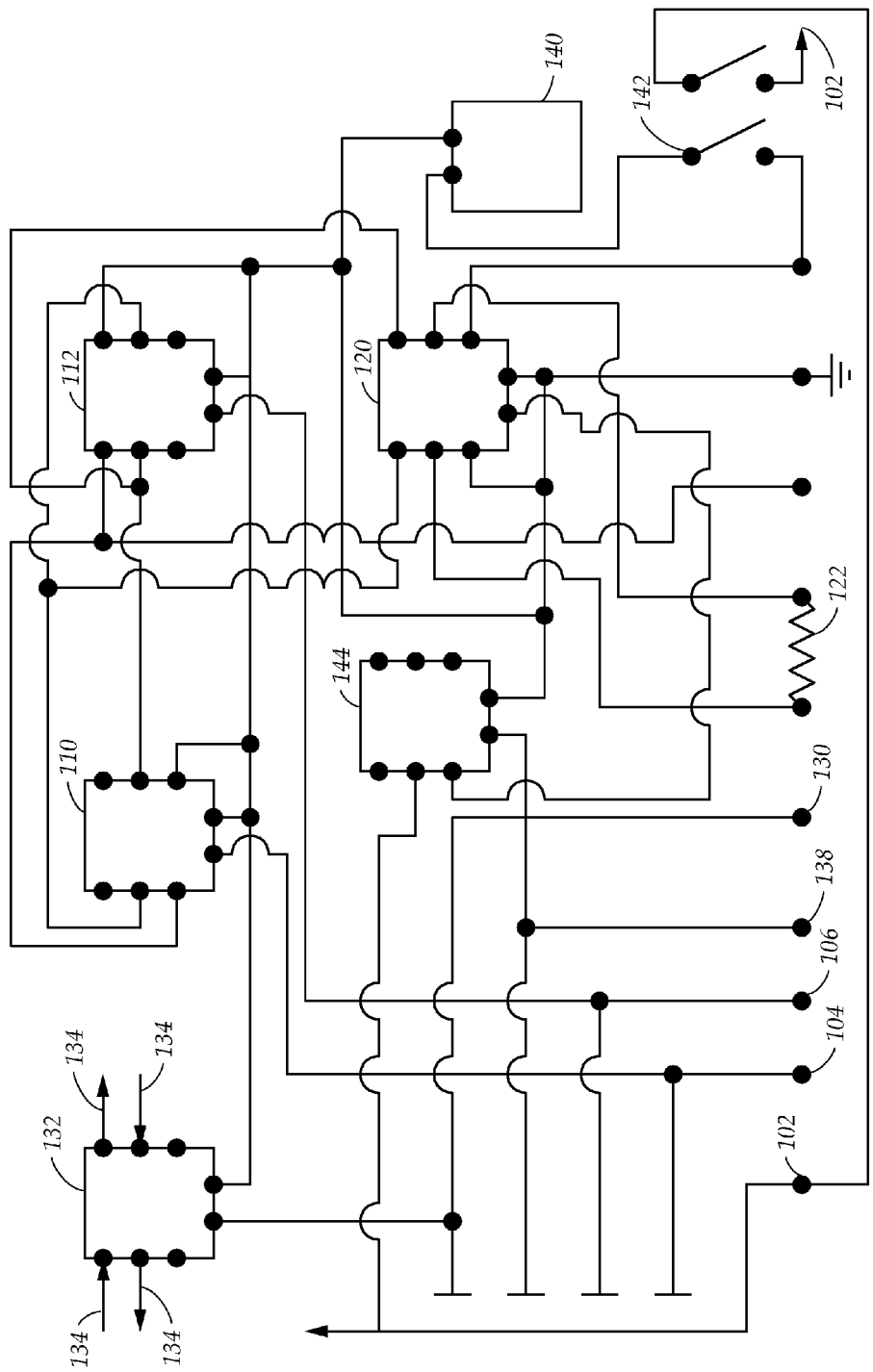
FIG. 4 is a wiring diagram of the invention.

FIG. 4 shows a wiring diagram 100 of the controller. The power supply rod 102 has 15 DC volts running through by dropping the AC current down through resistors. When the circuit is completed through the wiring with the lower sensor 104, the first relay 110 opens the solenoid valve through the solenoid relay 120. When the upper sensor 106 completes the circuit, the second relay 112 closes the solenoid valve 122. When the circuit is completed through the wiring with the pump sensor 130, the pump relay 132 switches on 115 volts in alternating current 134, powering the pump. When sufficient water is expelled, the circuit is broken and no power is supplied to the relay 132 and power is shut off to the pump 130. When there is a fault, the power supply rod switches 142 from the 15 volt power to the battery 140 the fault relay 144 draws 9 DC volts from the battery 140 to the solenoid relay 120 to close the solenoid valve 122.

Figure 5:
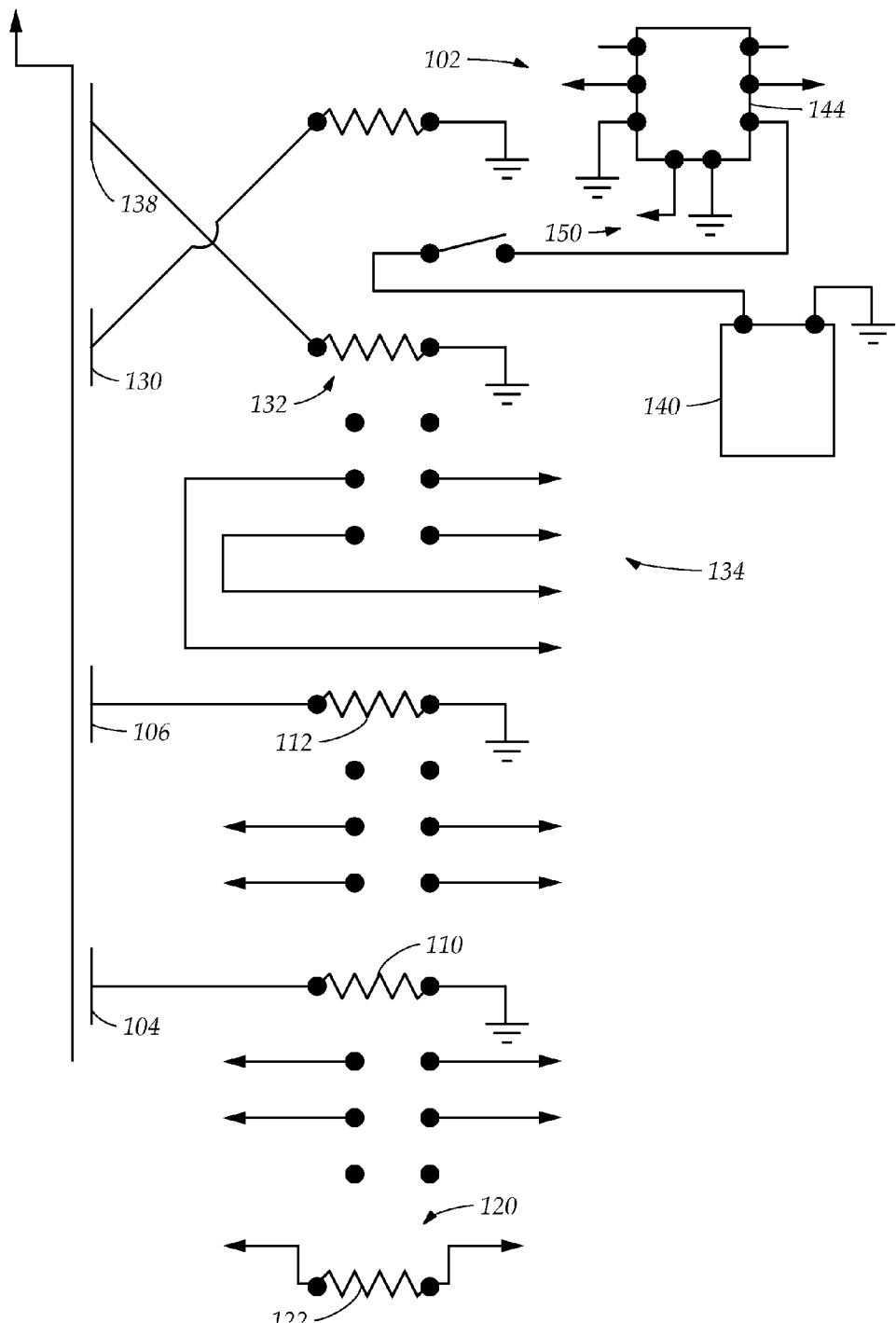
FIG. 5 is a schematic diagram of a further embodiment of the invention.

Referring to FIG. 5, a schematic diagram for the circuitry is presented. The power supply rod 102 has 15 DC volts 150 running through by dropping the AC current down through resistors. The power supply rod has a battery 140. When there is a fault, the power supply rod switches from the 15 volt power to the battery 140 the fault relay 144 draws 9 DC volts from the battery 140 to the solenoid relay 120 to close the solenoid valve 120. When the circuit is completed through the wiring with the lower sensor 104, the first relay 110 opens the solenoid valve through the solenoid relay 120. When the upper sensor 106 completes the circuit, the second relay 112 closes the solenoid valve 120 through the solenoid relay 122. When the circuit is completed through the wiring with the pump sensor 130, the pump relay 132 switches on 115 volts in alternating current 134, powering the pump. When sufficient water is expelled, the circuit is broken and no power is supplied to the relay 132 and power is shut off to the pump 130.

Referring to FIG. 1, the board has a plurality of parallel vertical grooves 24, a first groove for the power supply rod 32, a second groove for the pump switch sensor 34 and a third groove for the solenoid valve sensor series 40. To adjust the position of the sensors on the board 22 to adapt to different pools 90 having the pool equipment at different depths, the sensors slide up and down within the grooves 24 and are selectively fixed at a height determined by the minimum level and the maximum level of water required by the pool to properly function.

The board 22, having a top attached to the housing 22T and a bottom 22B with a platform 18, has the submersible pump 50 placed on the platform 18. The pump is powered 50 through a cord 52 that connects through the housing 20 to the circuitry. The circuitry connects to the AC current of nominally 115 volts. The circuitry is in the housing 20 and isolated from the water. The AC voltage that powers the pump 50 is only applied when the pump sensor detects the overflow condition and a relay opens to allow the current through to power the pump. The voltage is not applied to the system below the water except when the pump is operating to eliminate the danger of accidental electrocution of a person or animal in the water. The pump has an inlet 54 and a hose coupling 14 on an outlet 56. A garden hose 16 or similar type of tubing having a pair of ends is attached to the pump, a first end 16E to the coupling and second end directing the flow of water out of the pool 90 from the pump 50 to a sewer or other drainage.

Figure 2:
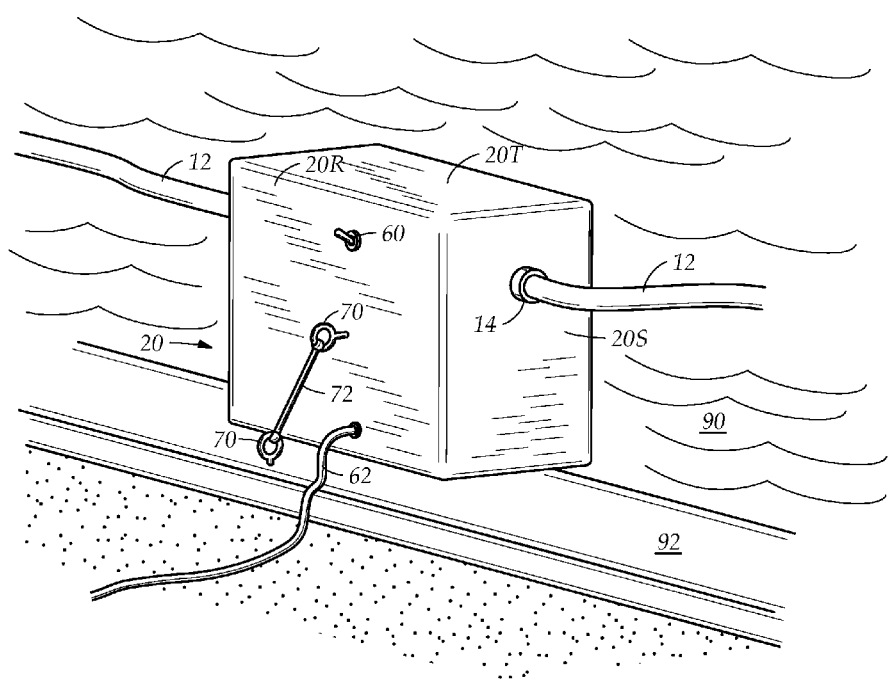
FIG. 2 is a diagrammatic perspective rear view of the invention installed poolside.

FIG. 2 shows a diagrammatic perspective rear view of the invention installed in the pool, the pool having a deck 92, the housing installed on the deck 92 at of the pool. The housing 20 is selectively tethered to the pool deck 92 by a tether 72 connecting the eyebolt 70 on the housing 20 to the eyebolt 70 on the pool deck 92. The tether 72 prevents the housing from falling into the pool 70, creating a safety hazard and ruining the circuitry. Connected to the housing is a power cable 62 supplying AC current to the system. The housing has an external switch 60 for a fault battery inside the housing 20. The battery is a backup in case of failure of the AC current. The switch 60 selectively powers off the fault battery when the controller 10 is not in use or the controller is decommissioned for storage.

To install the automatic controller 10, as shown in FIG. 1, the pool owner attaches the hose 16 and hose segments 12 to the hose couplings 14 on the side panels 20S and pump 50. The pool owner places the controller 10 on the pool deck 92, placing the front panel 20F with the board 22 into the water. The pool owner adjusts the sensors 30 in the grooves 24 for the desired water levels for the pool equipment to function. The pool owner connects the first hose segment 12 to the domestic water supply and positions the second hose segment 12 into the pool. The pool owner places the hose 16 from the pump 50 into a drain or sewer. The pool owner plugs the power cable 62 of the controller into AC current. The pool owner attaches the tether 72 to the eyebolts 70, the first on back panel 20R and the second on the pool deck 92. The pool owner switches on the fault battery backup switch 60, leaving the pool unattended for extended periods of time.

When the controller 10 is installed, the water level of the pool 90 is monitored by the sensors 30. When the lower solenoid sensor 44 detects an unacceptably low water level, the sensor triggers the first relay to open the solenoid valve connected to the domestic water supply by the hose segment 12. The open solenoid valve allows the water to flow into the pool 90, filling it to a level sufficient for the pool equipment to operate properly. When the sufficient level is achieved, the upper solenoid sensor 42 detects the acceptable water level and triggers the second relay to close the solenoid valve. If the AC current is interrupted, the controller 10 maintains a voltage over the power supply rod 32 by switching to the 9 volt battery backup that triggers a relay that shuts the solenoid valve, shutting the flow of water into the pool to avoid over-filling.

If a heavy rain occurs that fills the pool 90 higher than acceptable for the pool equipment, the pump sensor 34 detects the high level and switches on the pump 50. The pump 50 expels water from the pool 90 into a drain or sewer until the pump sensor 34 loses conductivity with the power supply rod 32 by the water level dropping to an acceptable level, switching the pump 50 off.

To store the controller 10 when not in use, the pool owner switches off the fault battery with the switch 60, unplugs the power cable 62, detaches the hose 16 and hose segments 12 and removes the controller 10 from the pool deck 92.

In conclusion, herein is presented a controller for a water level system for a swimming pool that monitors water level and automatically replenishes or expels water to maintain the desired level of water in the pool. The invention is illustrated by example in the drawing figures, and throughout the written description. It should be understood that numerous variations are possible, while adhering to the inventive concept. Such variations are contemplated as being a part of the present invention.

What is claimed is:

1. An automatic pool level controller, for maintaining a desired level of water in a swimming pool, comprising:
   a housing with a front board, the front board having a bottom platform, the front board extending into a swimming pool;
   a sensor system having a plurality of sensors adjustably mounted on the front board, including a pump sensor and a solenoid valve sensor series having at least one sensor, the plurality of sensors having a power supply rod, the power supply rod providing current to the sensors when the sensors are triggered;
   a solenoid valve inside the housing, the solenoid valve selectively opening to let water into the swimming pool and selectively closing when the desired water level is achieved;
   a pump mounted on the bottom platform of the front board, the pump selectively switching on to expel water and selectively switching off when the desired water level is achieved; and
   a plurality of circuits inside the housing, the circuits connected to AC current, the circuits having a plurality of relays, the relays wired to the plurality of sensors, a first relay selectively switching on the pump when the pump sensor signals the relay that a high water level is present and switching off the pump when the pump sensor signals the relay that the desired water level is achieved, a plurality of relays that signals the solenoid valve to open to let water into the pool when the solenoid valve sensor series signals that the water level is low and closes the solenoid valve when the solenoid valve sensor series signals that the desired water level is achieved.

2. The automatic pool level controller as described in claim 1, wherein the sensors and the power supply rod are aluminum rods that conduct current, the sensors adjustably set such that when the water level reaches the sensor, the water completes a circuit between the power supply rod and sensor and the circuits in the housing, sending a signal to the relays.

3. The automatic pool level controller as described in claim 2, wherein the power supply rod draws 15 volts DC current to power the circuits completed through water with the sensors.

4. The automatic pool level controller as described in claim 1, wherein the front panel has a plurality of vertical grooves and the sensors and the power supply rod are attached in the grooves and are slideably adjusted in a position so that the sensors complete a circuit when the water level reaches the sensors.

5. The automatic pool level controller as described in claim 1, further comprising a fault sensor and fault circuit having a relay and a 9 volt battery, the fault circuit detecting that AC current has failed, the fault circuit switching the controller to the 9 volt battery to power the power supply rod, the power supply rod and the fault sensor completing the fault circuit if water fills the pool beyond the desired level, the completed fault circuit closing the solenoid valve.

6. The automatic pool level controller as described in claim 5, wherein the fault circuit has a switch, the switch is on the housing, the switch selectively powering the 9 volt battery when installing the controller and selectively powering off the 9-volt battery when storing the controller.

7. The automatic pool level controller as described in claim 1, wherein the pump has a coupling and attached to the coupling is a hose directed outside the pool, the pump expelling water through the hose outside the pool.

8. The automatic pool level controller as described in claim 1, wherein the housing has a pair of couplings, each coupling attached to a pair of hose segments, a first hose segment attached to a water supply and a second hose segment directed into the pool.

9. The automatic pool level controller as described in claim 1, wherein the pool has a deck and the housing has an eye and a tether having a pair of ends, a first end of a tether attaching to the eye on the housing and a second end of the tether attaching to the pool deck, anchoring the housing to the pool deck.

10. An automatic pool level controller, for maintaining a desired level of water in a swimming pool, comprising:
    a housing with a front board, the front board having a bottom platform, the front board extending into a swimming pool;
    a sensor system having a plurality of sensors adjustably mounted on the front board, including a pump sensor and a solenoid valve sensor series having at least one sensor, the plurality of sensors having a power supply rod, the power supply rod providing current to the sensors when the sensors are triggered;
    a solenoid valve inside the housing, the solenoid valve selectively opening to let water into the swimming pool and selectively closing when the desired water level is achieved;
    a pump mounted on the bottom platform of the front board, the pump selectively switching on to expel water and selectively switching off when the desired water level is achieved; and
    a plurality of circuits inside the housing, the circuits connected to AC current, the circuits having a plurality of relays, the relays wired to the plurality of sensors, a first relay selectively switching on the pump when the pump sensor signals the relay that a high water level is present and switching off the pump when the pump sensor signals the relay that the desired water level is achieved, a plurality of relays that signals the solenoid valve to open to let water into the pool when the solenoid valve sensor series signals that the water level is low and closes the solenoid valve when the solenoid valve sensor series signals that the desired water level is achieved; and
    a fault sensor and fault circuit having a relay and a 9 volt battery, the fault circuit detecting failure of AC current, the fault circuit switching the controller to the 9 volt battery to power the power supply rod, the power supply rod and the fault sensor completing the fault circuit if water fills the pool beyond the desired level, the completed fault circuit closing the solenoid valve.

11. The automatic pool level controller as described in claim 10, wherein the fault circuit has a switch, the switch is on the housing, the switch selectively powering the 9 volt battery when installing the controller and selectively powering off the 9-volt battery when storing the controller.

12. The automatic pool level controller as described in claim 10, wherein the sensors and the power supply rod are aluminum rods that conduct current, the sensors adjustably set such that when the water level reaches the sensor, the water completes a circuit between the power supply rod and sensor and the circuits in the housing, sending a signal to the relays.

13. The automatic pool level controller as described in claim 12, wherein the power supply rod draws 15 volts DC current to power the circuits completed through water with the sensors.

14. The automatic pool level controller as described in claim 10, wherein the front panel has a plurality of vertical grooves and the sensors and the power supply rod are attached in the grooves and are slideably adjusted in a position so that the sensors complete a circuit when the water level reaches the sensors.

15. The automatic pool level controller as described in claim 10, wherein the pump has a coupling and attached to the coupling is a hose directed outside the pool, the pump expelling water through the hose outside the pool.

16. The automatic pool level controller as described in claim 10, wherein the housing has a pair of couplings, each coupling attached to a pair of hose segments, a first hose segment attached to a water supply and a second hose segment directed into the pool.

17. The automatic pool level controller as described in claim 10, wherein the pool has a deck and the housing has an eye and a tether having a pair of ends, a first end of a tether attaching to the eye on the housing and a second end of the tether attaching to the pool deck, anchoring the housing to the pool deck.

* * * * *